United States Patent [19]

Fellowes

[11] Patent Number: 5,661,923
[45] Date of Patent: Sep. 2, 1997

[54] FISHING WEIGHT APPARATUS

[76] Inventor: Robert Fellowes, 110 Antrim Road., Woodley, Reading, Berkshire RG5 3NY, Great Britain

[21] Appl. No.: 436,169

[22] Filed: May 9, 1995

[30] Foreign Application Priority Data

| May 10, 1994 | [GB] | United Kingdom | 9409214.5 |
| Dec. 2, 1994 | [GB] | United Kingdom | 9424439.9 |

[51] Int. Cl.$^6$ .................................................. A01K 95/00
[52] U.S. Cl. ........................ 43/43.14; 43/44.9; 43/44.96
[58] Field of Search ................................ 43/43.1, 43.14, 43/44.9, 44.96, 42.09, 43.12, 42.22; 114/294, 298, 300, 307, 308; D22/145

[56] References Cited

U.S. PATENT DOCUMENTS

| 77,774 | 5/1868 | Smith | 43/43.14 |
| 501,346 | 7/1893 | Homan | 43/43.14 |
| 2,121,279 | 6/1938 | Beck | 43/43.14 |
| 2,517,375 | 8/1950 | Anderson | 43/43.14 |
| 2,557,776 | 6/1951 | Anderson | 43/44.96 |
| 2,589,715 | 3/1952 | Lysikowski | 43/43.14 |
| 2,863,253 | 12/1958 | Hettinger | D22/145 |
| 2,968,114 | 1/1961 | Spierer | D22/145 |
| 3,081,574 | 3/1963 | Wise | 43/43.12 |
| 3,180,052 | 4/1965 | Malesko | 43/43.12 |
| 3,461,597 | 8/1969 | Hobson | 43/43.14 |
| 3,803,749 | 4/1974 | Boyum | 43/44.9 |
| 3,852,906 | 12/1974 | LaForce | 43/43.14 |
| 3,939,595 | 2/1976 | Lockett | 43/43.12 |

FOREIGN PATENT DOCUMENTS

| 375696 | 6/1932 | United Kingdom . | |
| 15297 | 8/1981 | United Kingdom | 43/43.14 |
| 2078472 | 1/1982 | United Kingdom . | |
| 2171282 | 8/1986 | United Kingdom . | |

*Primary Examiner*—Jeanne Elpel
*Attorney, Agent, or Firm*—Howard & Howard

[57] ABSTRACT

An adjustable fishing weight apparatus (10) having a rod like weight support member (12) connected to a fishing line by a line attachment member (16) with removable weights (38) mounted on the support member (12) which may be added or removed from the support member (12) when attached to the fishing line. The weights (38) have central apertures through which the support member (12) is received and these weight units are secured on the support member (12) and restrained from longitudinal displacement by a restraining member in the form of a base plate (14) and a cap member (44) adjustable along and engagable with the support member (12).

32 Claims, 13 Drawing Sheets

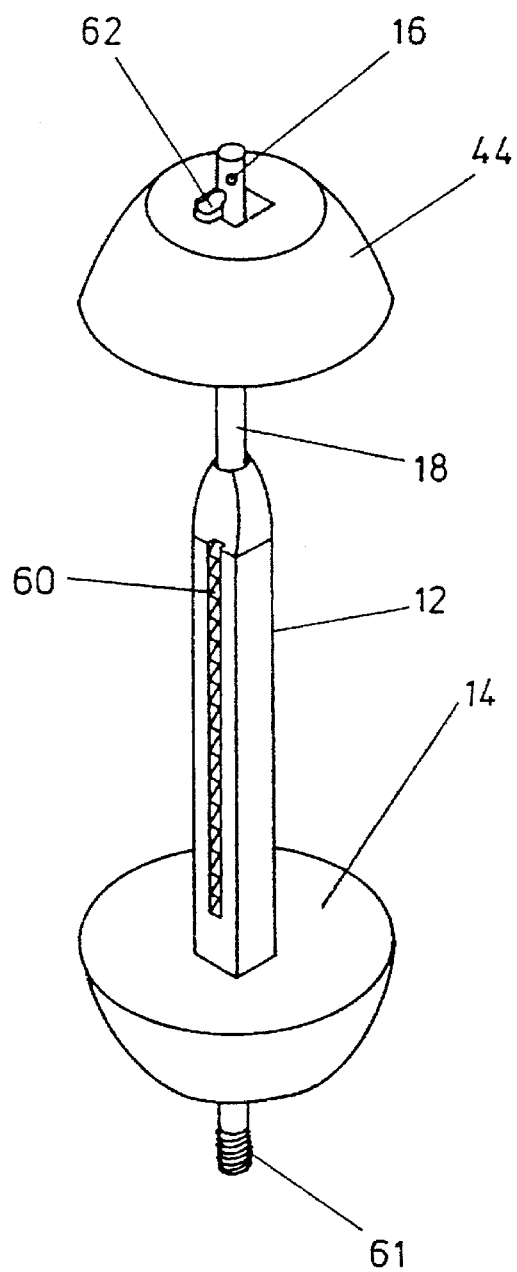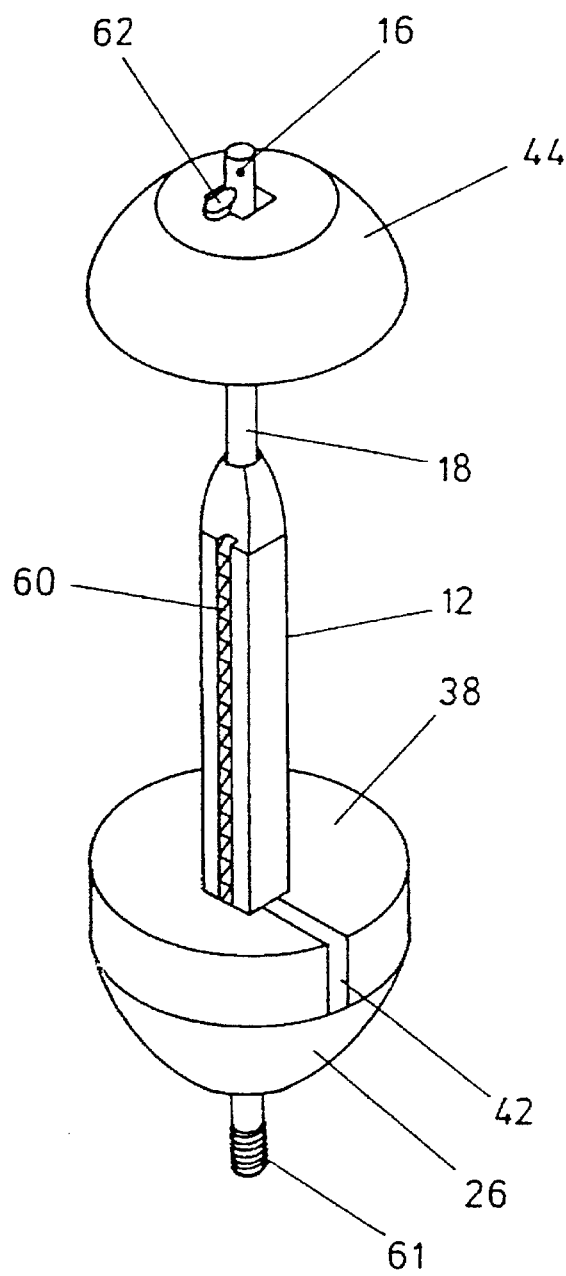
FIG. 21
FIG. 22

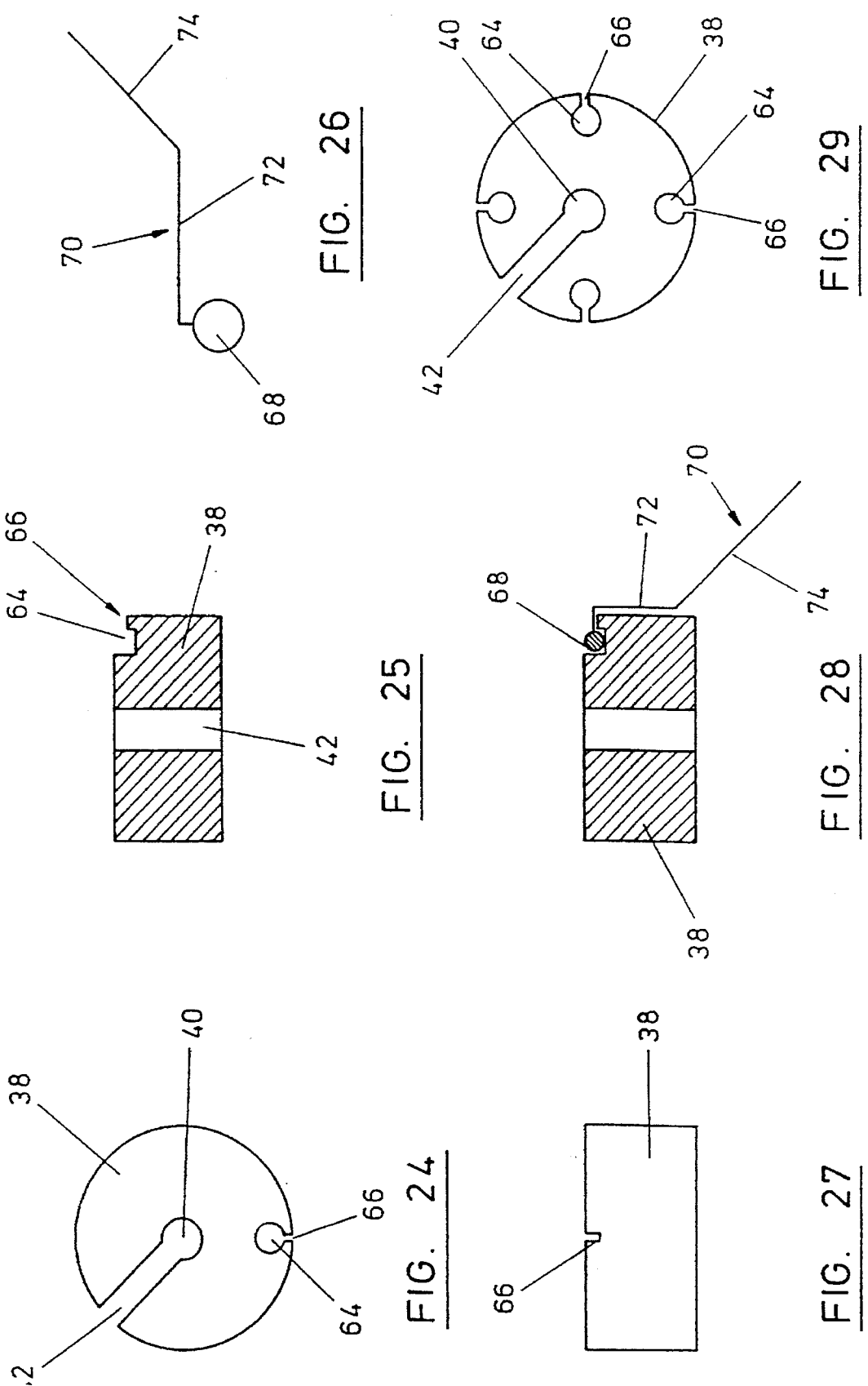

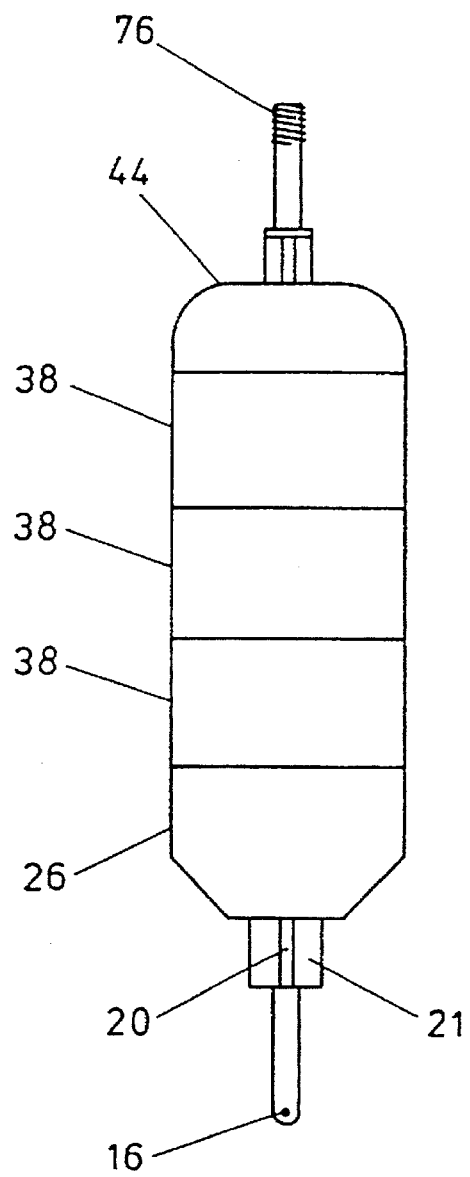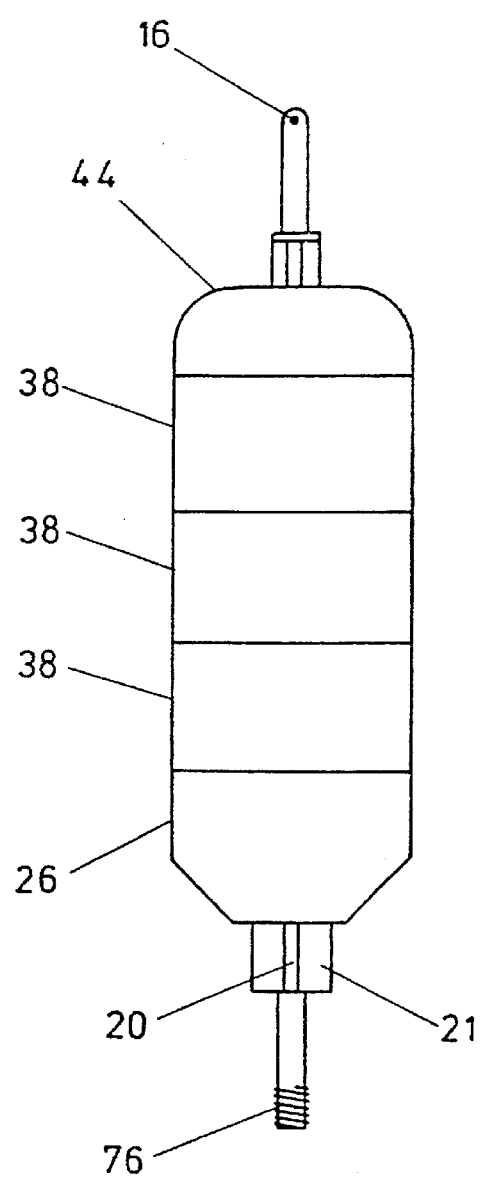
FIG. 31
FIG. 32

FISHING WEIGHT APPARATUS

This invention relates to a fishing weight. More particularly, the invention relates to an adjustable weight which finds particular application in sea fishing from boat and shore. However, the invention may have application for all types of fishing.

When sea angling off shore, anglers are faced with the problem that they cannot predict precisely the amount of weight which will be required on the line when fishing, as conditions will vary from hour to hour depending on the tide and current. In order to cover all eventualities, an angler must have available an array of various weights. An additional problem is that when lowering the tackle to the sea bed, this needs to be done quickly in order that the tackle remain as close to the boat as possible in order to avoid the tackle drifting away from the angler and causing excess line to need to be reeled out.

A problem facing shore anglers is that they need to cast the tackle out into the water and thus the weight which can be added to the tackle to ensure that it holds the sea bed is limited.

Prior proposals in relation to fishing weights are legion, and all require that they be attached directly to the line or other tackle in use. It is also common that such weights are produced by the anglers themselves and as such are often of an inefficient aerodynamic shape which also results in causing resistance when the weight is dropped into the water. This causes the weight and associated tackle to "drift" away from the angler. The addition of weights or removal of weight depending on the conditions often requires interference with the line or tackle in use. This calls for a high degree of manual dexterity and this can be difficult in cold wet conditions such as would be experienced out to sea. To the best of the applicants knowledge, no prior proposal provides a satisfactory solution to the requirement of weight and for such weight to be easily adjustable and efficient to use.

Accordingly, an object of the present invention is to provide fishing weight apparatus providing improvements in these respects or in relation to any one or more matters discussed herein or generally.

According to the present invention there is provided an adjustable fishing weight apparatus comprising a rod-like weight support means, discrete weight units supported on said support means, means for releasably retaining said weight units on said support means and a line attachment means for attaching said apparatus to a fishing line, in which said weight units may be added to or released from said support means when said apparatus is attached to the fishing line.

Preferably, the weight support means will comprise an elongated spine and the weight units will comprise a longitudinally extending aperture, which is usually central, through which the spine is received in a complementary fit to allow the weight units to slide longitudinally along the spine. Usually, the spine will have a base, usually in the form of a transversely extending plate, towards one end and this base will have a transversely extending surface area greater than the apertures of the weight units so that the weight units cannot pass the base plate. The spine itself will usually be formed from suitable material, preferably a moulded plastics material which will provide the required the lightness and strength. It is also envisaged that the spine may be formed as a fluted shape as a consequence of production requirements.

In addition, the spine will usually have a neck portion towards an opposed end of the spine, away from the base, and this neck portion having a smaller cross sectional area than the cross sectional area of the spine itself. The weight units themselves preferably comprise a slot extending radially outwardly from the central apertures to an edge of the weight unit which forms a break in the edge, whereby the slot has a width substantially less than the aperture but sufficiently wide enough to allow the neck portion of the spine to pass through the slot. Since this aperture corresponds to the cross sectional area of the spine the weight unit may be slotted on to the spine where the neck portion may pass through the slot of the weight unit and then the weight unit displaced longitudinally along the spine which may then pass through the aperture of the weight unit. The cross sectional area of the spine corresponds to the cross sectional area of the aperture of the weight unit and may be substantially greater than the width of the weight unit slot so that the weight unit is restrained from transverse displacement relative to the spine.

In the preferred form of the present invention the retaining means will comprise a locking cap member which is disposed towards the opposed end of the spine to the base plate and this cap member being longitudinally adjustable along and engageable with the spine, whereby the weight units are disposed between the base plate and the cap member so that engagement of the cap member with the spine will restrict longitudinal movement of the weight units relative to the spine. Usually, this cap member will have a longitudinally extending central aperture through which the spine is received in a complementary fit and this cap member will have a cross sectional area greater than the cross sectional area of the apertures of the weight unit. This cap will usually be engageable with the spine between the neck portion and the base plate whereby the weight units are added to the spine to be supported between the neck portion and the base plate and the cap member is then adjusted along the length of the spine towards the base plate to engage and compress the weight units between the base plate and the cap member and the cap member then engages the spine, restraining the weight units from longitudinal displacement relative to the spine.

Preferably, the spine will have a uniform circular cross section with a longitudinally extending axis and the locking cap member will have a longitudinally extending circular aperture, with the weight units also having circular apertures to enable a complementary fit with the spine.

In one preferred embodiment of the present invention the spine will have a screw or helical thread on its outer surface and the cap will have a complimentary thread formed on the inner surface of the aperture for a screw threaded engagement with the spine. In this way, the weight units may be slotted on to the spine and moved longitudinally along the spine to abut the base plate and the cap member then screwed along the spine to compress the weight units between the cap member with the base plate, securing the weight units in place on the spine. Alternatively, or in addition, the weight units themselves may have similar screw threads on the inner surfaces of their apertures for screw threaded engagement with the spine. In this way, the cap member may not be required to restrain the weight units from longitudinal displacement along the spine, but the retaining means comprising the screw threaded weight units themselves.

According to a further embodiment of the present invention the retaining means may comprise a compression member mounted coaxially on the spine inwardly and adjacent to the base with spring means disposed between the compression member and the base biassing the compression member away from the base. This retaining means will also comprise an aligned array of lugs disposed longitudinally and equidistant along the length of the spine, with the apertures of each weight unit having a longitudinally extending groove for cooperation with these lugs on the spine so that when the weight units are mounted on the spine the grooves may pass over the lugs to allow longitudinal displacement of the weight units along the spine. In addition, the cap member will have a longitudinally extending groove radiating outwardly from the aperture of the cap member, and this groove may cooperate with the lugs to allow the cap member to move longitudinally along the spine, whereby the cap member also has a surface disposed away from the base with a recess in the surface radiating outwardly from the aperture and disposed offset from the groove of the cap member, whereby the cap member is displaceable along the spine towards the base, compressing any weight units on the spine towards the compression member and thus moving the compression member, against the biasing of the spring means, towards the base so that the groove of the cap member passes over at least one of the lugs on the spine and wherein rotational displacement of the cap member about the spine brings the cap member recess into alignment with the lug so that when the force applied to the compression member is released the biasing of the spring means exerts a bias force away from the base, through the compression member and adjacent weight units and the cap member to bias the cap member away from the base so the recess engages with the lug which then restrains the cap member from relative rotational and longitudinal displacement with the spine.

Preferably, the weight units will have a uniform length greater than the distance between adjacent lugs on the spine so that the lugs engage with the weight unit grooves to restrict relative rotational movement between the weight units and the spine.

The compression means will usually comprise a longitudinally extending skirt which extends longitudinally outwardly of the spine, beyond the base so that this skirt engages with spine projections radiating outwardly from the spine beyond the transverse extent to the base and this engagement restricts relative rotational displacement between the spine and the compression means. These spine projections usually extend radially opposite each other and may be of sufficient size to provide stability when the weight is on the sea bed to reduce any tendency of the weight apparatus to roll as the movement of water passing over the weight when on the sea bed may act on these large projections and stabilize the weight, reducing its tendency to roll.

In yet another embodiment of the present invention, the retaining means may comprise a spine having a ratchet extending between the neck and the base with the cap member having a ratchet tongue for engagement with this ratchet to restrain the cap from longitudinal displacement relative to the spine. Usually the cap member will have displacement means for displacing the ratchet tongue out of engagement with the ratchet to allow the cap member to move longitudinally along the spine. This displacement means usually comprises a pivoted ratchet tongue with an engaging end biased so that the engaging end engages with the ratchet when it is in an unactuated position and whereby depression of an opposed end of the ratchet tongue will pivot the engaging end to an actuated position which is out of engagement with the ratchet. In this preferred embodiment, the spine will usually comprise a rectangular cross section with the weight units and the cap member also having a longitudinally extending rectangular apertures to form a complementary fit with the spine which restricts relative rotational movement between the spine and the cap member and the spine and the weight units.

In all of the embodiments of the present invention, additional weight units may be added to the spine until the required weight is obtained. The cap member may be moved longitudinally along the spine, away from the base and beyond the neck portion to allow the slot extending from each weight unit aperture to engage the neck, thus allowing the weight units to be placed on or removed from the spine when the spine itself is connected to the fishing line. When a weight unit is added to the spine the neck is passed through the slot until the weight unit is centrally located about the spine, and the weight unit is then caused to slide down the spine until it contacts the previous weight or the base. Successive weights can be added or removed in this manner until the required weight is achieved. This provides the advantage that the spine does not need to be disconnected from the line in order to vary the amount of weight carried.

Usually, cap member and, where applicable, the compression means are not provided with radially extending slots from their respective apertures and these components are usually placed on to the spine prior to its attachment to a fishing line. The cap can then be forced to move up the spine and back along the fishing line in order to accommodate the additional weights. Once the weights are in position the cap is forced to move back down the fishing line onto the spine and is then locked in the required position. However, it will be appreciated that the cap maybe provided with a radially extending slot, if required, so that it may be removed from the spine once the spine has been connected to the fishing line. In addition, the base, cap member and weight units are suitably shaped so that the assembled weight apparatus presents as little resistance as possible when caused to enter the water. Usually the weight units will have uniform circular cross section with a cap member and the base both having circular cross sectional areas which taper longitudinally outwardly of the weight support means.

In the event that still further weight is required, secondary weight units maybe passed over and mounted about the assembled weight units on the spine. Usually, these secondary weight units will have longitudinally extending central apertures corresponding in shape and size to the maximum cross section of the weight units so that the spine and weight units are received through the apertures of the secondary weight units in a complementary fit and secondary retaining means are provided to restrain the secondary weight units from longitudinal displacement relative to the spine. Preferably, the secondary retaining means will comprise at least two restraining washers, each having a central aperture through which the spine may be received in a complementary fit and also have a cross section greater than the cross section of the apertures of the secondary weight units, whereby the restraining washers are longitudinally disposed remote from each other on the spine at longitudinally opposed ends of at least one weight unit and restrained from longitudinal displacement relative to the spine by the retaining means, the secondary weight units being disposed between adjacent restraining washers to restrain the secondary weight units from longitudinal displacement relative to the spine.

The restraining washers may comprise a slot extending radially outwards of their central aperture to the edge of the restraining washer, forming a break in this edge, this slot having a width substantially less than that of the aperture of the washer, but sufficiently wide enough for the neck portion of the spine to pass through the slot. In this way, the washer may be mounted on the spine in a similar manner to the weight units. In addition, where an embodiment of the present invention comprises lugs on the spine as part of the retaining means, the restraining washers comprise notches extending radially outwards from the apertures for cooperation with these lugs when mounted on the spine to allow the restraining washers to move longitudinally over the lugs along the spine.

The secondary weight units themselves may each comprise a slot extending radially outwardly from their central aperture to an edge of these secondary weight units, thereby forming a break in the edge. The slots may have a width substantially less than that of the aperture but sufficiently wide enough to allow the neck portion of the spine to pass through the slot. Thus, in use the weight units may be added to the spine in a manner previously discussed with a washer disposed between either two weight units or a weight unit and the base. The secondary weight units may then be added to the apparatus by passing the neck of the spine through the slot of the secondary weight unit and then moving the secondary weight unit longitudinally along the spine so that the weight units can pass through the aperture of the secondary weight unit until this secondary weight unit abuts the restraining washer. When sufficient weight has been added to the apparatus, a second restraining washer may be added offset from the first restraining washer, and the cap member moved to engage the spine to restrain the weight units and, thus, the restraining washers from displacement along the spine. The restraining washers then prevent longitudinal displacement of the secondary weight units.

Usually, the line attachment means will comprises an elongated body attached to and extending longitudinally away from an end of the spine, whereby this elongated body has an aperture extending transversely through it which allows the fishing line to be tied to it. This elongate body may be attached to either end of the spine, either adjacent to the base plate or adjacent to the neck portion of the spine. Where it is attached to the end adjacent to the neck portion it will be appreciated that to add the weight units to the apparatus when the line has been connected they must pass over the neck portion. However, when the elongated body is attached to the base plate it will be appreciated that the slots in the weight unit apertures may not be necessary since the cap may be removed completely from the spine and the weight units passed along the spine accordingly over its free end opposed to the line attachment means.

According to a further aspect of the invention the apparatus may also comprise a joining means attached to an end of the spine opposite to the line attachment means, whereby the joining means may facilitate attachment of additional fishing tackle to the weight apparatus. This joining means will usually comprise a screw threaded rod for reciprocal screw threaded engagement with a screw threaded member of additional fishing tackle.

In a still further aspect of the present invention, which is more applicable to on-shore sea fishing, there is provided a weight for use in fishing which comprises anchoring means. In on-shore fishing of the type typically carried out on a beach the angler is limited to the amount of weight he can use to ensure the tackle holds to the sea bed as he must be able to cast efficiently without breaking the line. Therefore, to help overcome this problem the weight units will preferably comprise anchoring means in the form of removable grip wires. In a preferred form, the grip wire will have a bead secured at one end and the weight units will comprise two longitudinally opposed faces in which one of the faces has a recess towards its periphery with a slot extending transversely from this recess to the peripheral edge of the weight unit. The bead of the grip wire is received within this recess and the grip wire then extends through the slot outwardly of the periphery of the weight unit. In use, the bead will be restrained within the recess of the weight unit by an adjacent face of an adjacent weight unit whereby relative longitudinal displacement between adjacent weight units is restrained by the retaining means previously described. Preferably, the wire extending proud of the weight unit is bent so that part of the wire lies parallel to a longitudinally extending outer surface of the weight unit within a groove to restrain movement of this wire. The free end of the wire is further bent to project proud to the outer surface of the weight unit, acting to anchor the weight on the sea bed. When the weight is to be retrieved, such as when a fish has taken the bait, the force applied to the wire lodged in the sea bed by the angler reeling in the line is sufficient to dislodge the wire from the groove, and the bead, being free to rotate within the aperture, causes the wire to move and hang loosely, permitting for the weight to be withdrawn from the sea bed.

This embodiment provides the advantage that the fishing tackle can be anchored to the sea bed to resist tide and current without the requirement of excessive weight.

In a still further aspect of the present invention the elongated spine can itself be formed with a central aperture or hole, so as to accommodate the fishing line, thus permitting the weight apparatus to be threaded on the line and not simply attached to it, facilitating adjustable connection of the spine to the fishing line. It is envisaged that the weight support means will usually be made of moulded plastics material while the weight units will usually be made of metal. However, it will be appreciated that the weight units and cap member may be made of other materials such as plastics with weighted inserts.

Since a number of individual weights are retained on the elongate spine, this provides the advantage that all the required weight is carried by single structure. Additionally, the weight carried by the structure can be varied whilst the structure is attached to a fishing line.

Several embodiments of the present invention will now be described by way of example only, with reference to the accompanying illustrative drawings in which:

FIG. 10 shows a sectional view of the locking cap taken on the line I—I of FIG. 9a;

FIGS. 21, 22 and 23 show perspective views of a further embodiment of the invention having a ratchet mechanism;

FIG. 24 shows a plan view of an intermediate weight unit according to a further embodiment of the invention;

FIG. 25 shows a sectional view of the weight unit of FIG. 24;

FIG. 26 shows diagrammatically the bead and wire arrangements;

FIG. 27 shows a side view of the weight and slot for receiving said wire of FIG. 26;

FIG. 28 is a sectional view of the weight unit of FIG. 27 showing location of the bead and wire;

FIG. 29 shows a plan view of a weight unit with four location points for beads and the wires to be secured thereto;

FIGS. 31 and 32 show an assembled weight apparatus with a screw threaded mounting for attachment of additional tackle;

Figure 3:
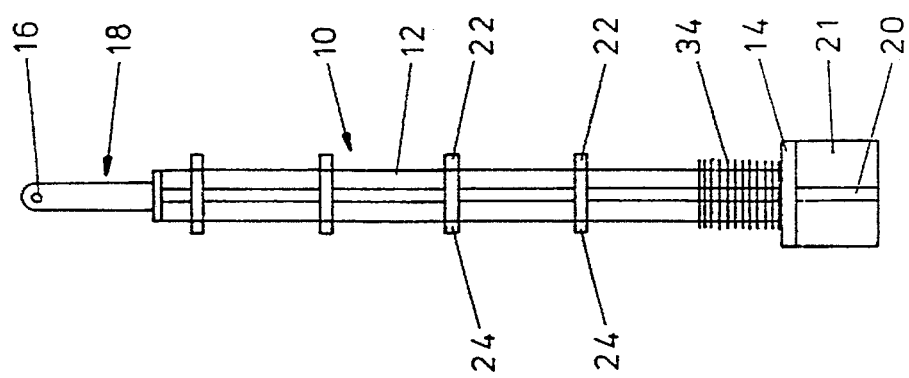
FIG. 3 shows a side view of the spine of FIG. 1.
Figure 2:
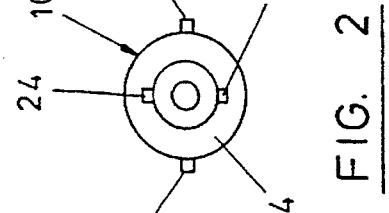
FIG. 2 shows a plan view of the spine of FIG. 1.
Figure 1:
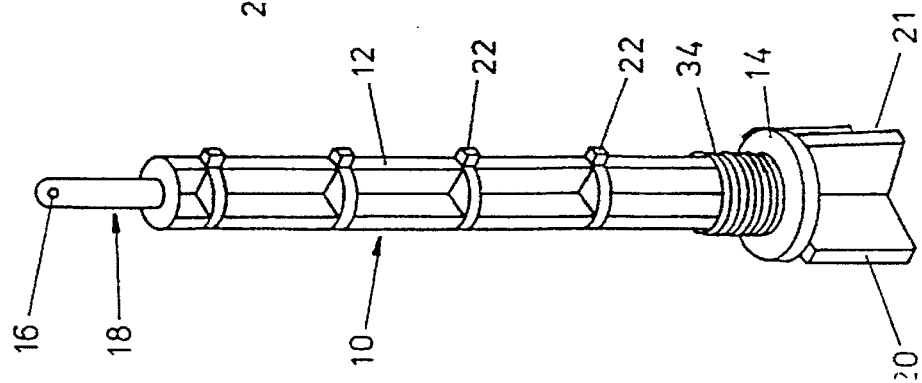
FIG. 1 shows a perspective view of an elongate spine.

As shown in FIGS. 1, 2 and 3, weight support means 10 comprises an elongate spine 12. The spine 12 is formed With a base plate 14 and means 16 for attachment to a fishing line (not shown). Spine 12 may serve, in use, as a weight at the end of a fishing line, and which rests on the sea bottom. A neck portion or region 18 of the spine 12 for attachment to a line or like is of a smaller diameter than the main body of the spine 12. Spine 12 is formed with two pairs of radially extending fins, located opposite one another beneath the base plate 14. One pair of fins 20 extend beyond the outer periphery of base plate 14. The other pair 21 extend only to the outer periphery of base plate 14. The spine 12 is also formed with a pair of radially extending lugs 22, 24, each pair of lugs 22, 24 located opposite one another at intervals along the length of the spine 12. It is envisaged that the spine 12 will be formed by a plastics injection moulding process.

Figure 4:
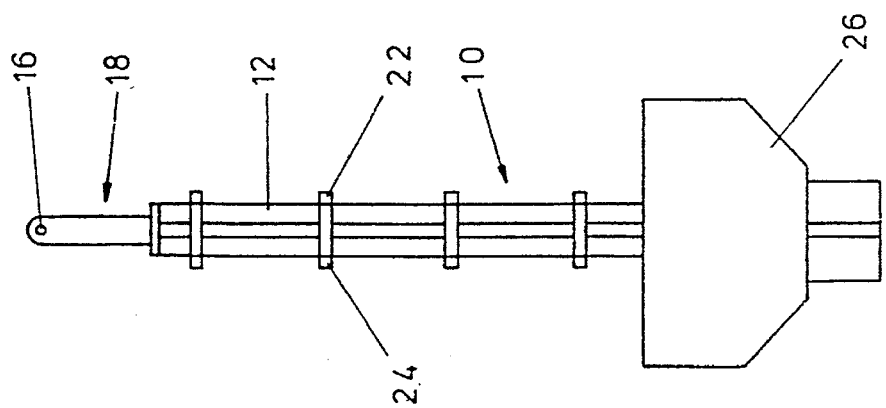
FIG. 4 illustrates the view of FIG. 3 with the compression member in position.
Figure 6:
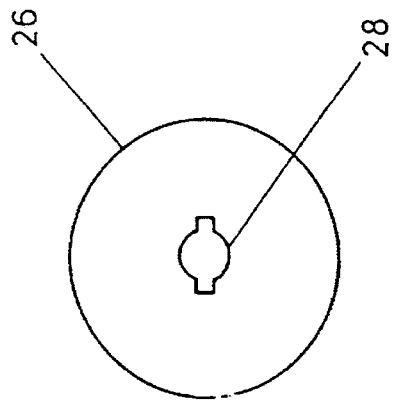
FIG. 6 is a plan view of the compression member of FIG. 4.
Figure 5:
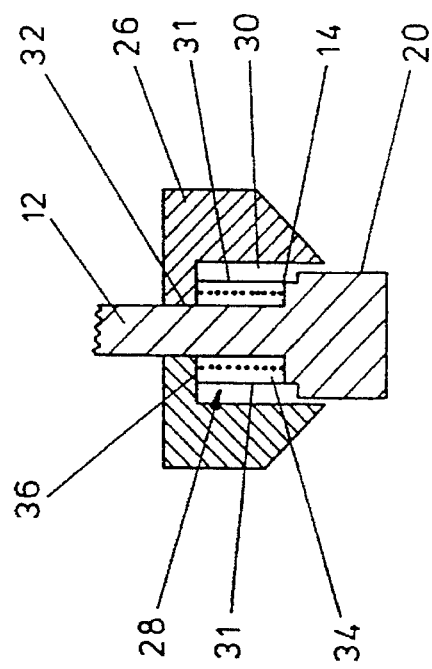
FIG. 5 shows a sectional view of the lower part of the spine of FIG. 1 together with the compression member and spring.
Figure 10:
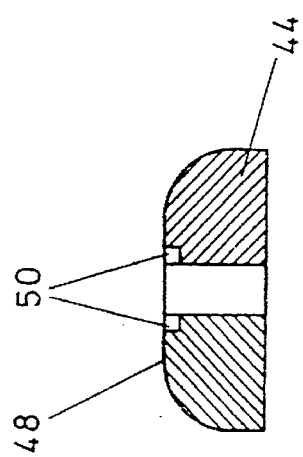
Figure 11:
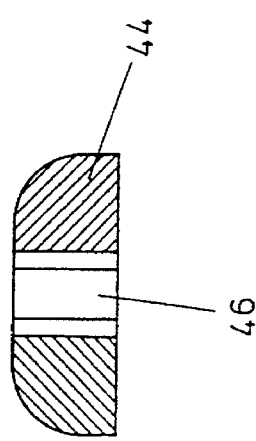
FIG. 11 is a further sectional view of the locking cap taken on the line II—II of FIG. 9b.
Figure 9B:
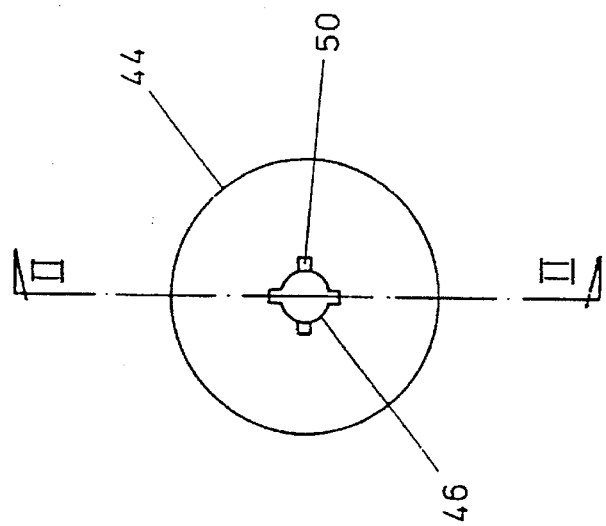
FIGS. 9a and 9b show plan views of the locking cap.
Figure 9A:
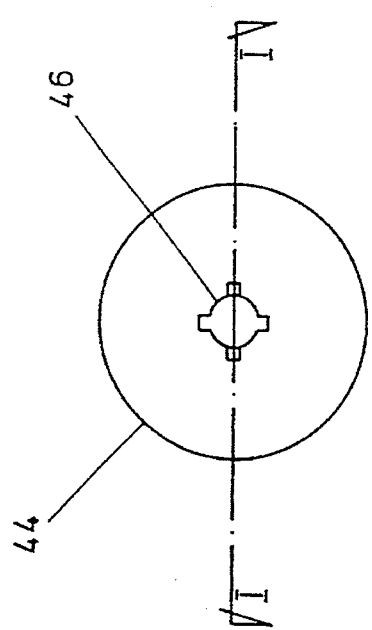

The first component to be placed on the spine 12 is a compression member 26 as shown in FIG. 4. As indicated in FIGS. 5 and 6, the member 26 is formed with a central bore 28 which is shaped so as to accommodate spine 12 and lugs 22, 24 as the member 26 is threaded on to the spine. The bore 28 has regions of differing diameter namely, a wide region 30 and a narrower region 32. The region 30 of bore 28 being of a size sufficient so as to accommodate a spring 34 which is threaded onto the spine 12 prior to compression member 26 and which contacts the base plate 14. The region of the bore 28 between the wide region 30 and the narrow region 32 forms shoulders 36.

As the compression member 26 is moved towards the base plate 14, the shoulders 36 of the bore 28 contact the spring 34 and this holds the compression member 26 clear of the base plate 14. The spring 34 is concealed by the compression member 26 during use. The inner wall of the compression member 26 is formed with grooves 31 which co-operate with fins 20 when the weights are in a locked position.

Once the compression member 26 is in position on the spine 12, further intermediate weights 38 are threaded onto the spine 12 until the required total weight is achieved.

Figure 8:
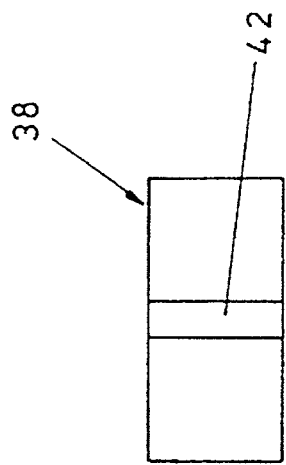
FIG. 8 shows a side view of the weight unit of FIG. 7.
Figure 7:
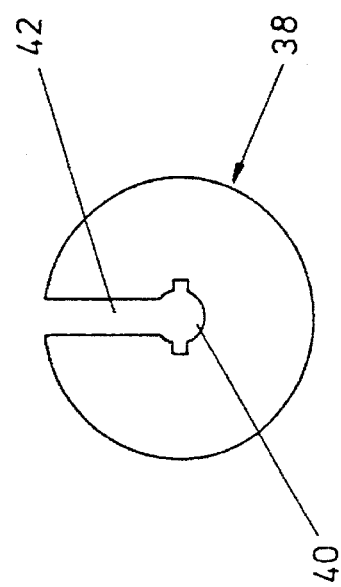
FIG. 7 shows, a plan view of an intermediate weight unit.

FIG. 7 and 8 show the intermediate weight 38. It is envisaged that the intermediate weights 38 will be cast in lead or any other suitable material in the usual manner. Intermediate weight 38 is formed with a suitably shaped central bore 40 so as to accommodate the spine 12 and lugs 22, 24. The intermediate weight 38 is formed with a slot 42 which extends from the central bore to the edge of the weight 38. The slot 42 is of a sufficient size so as to accommodate the narrow region or neck 18 of the spine 12. The weight 38 is threaded on to the spine 12 until the required weight is achieved. Once this is reached a locking cap 44 is threaded onto the spine 12 above the intermediate weight 38.

As shown in FIGS. 9a, 9b, 10 and 11, locking cap 44 is also formed with a suitably shaped aperture 46 so as to accommodate spine 12 and lugs 22, 24. The locking cap 44 lacks the radially extending slot 42 of the intermediate weights 38. The upper surface 48 of the cap 44 is formed with grooves or recess 50 which extend radially from the central aperture 46.

Figure 12:
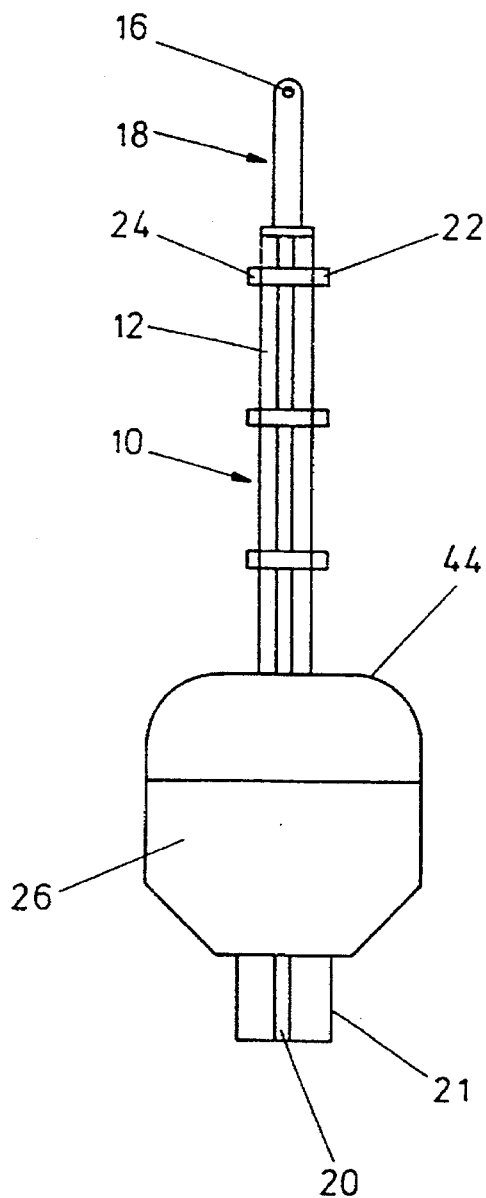
FIG. 12 shows the compression member and the locking cap in position on the spine.
Figure 13:
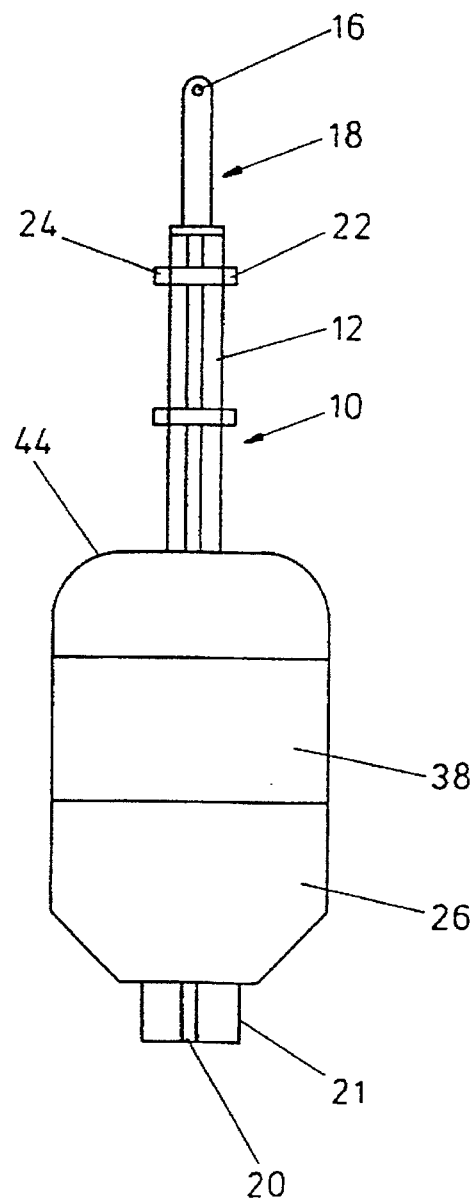
FIG. 13 shows the view of FIG. 12 with addition of an intermediate weight unit located between the locking cap and the lower compression member.
Figure 14:
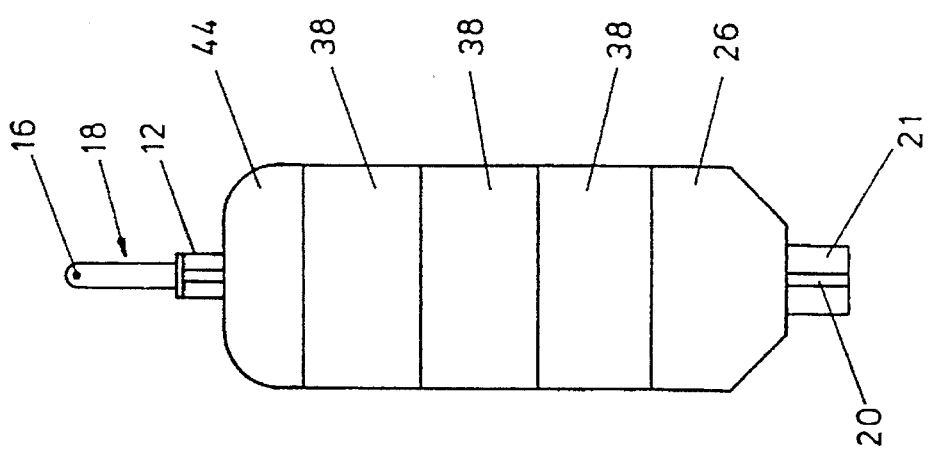
FIG. 14 is a view of FIGS. 12 and 13 with the addition of three intermediate weight units.

FIGS. 12, 13 and 14 illustrate fishing weight 10 supporting different numbers of intermediate weights 38 located between the compression member 26 and the locking cap 44.

To secure the weights in position once the required total weight has been achieved, the user depresses the cap 44. This causes the weights 38 and the compression member 26 to move downwards as viewed. This movement is accommodated by compression of the spring 34 located within the wide region 30 of the bore 28 of the compression member 26. The cap 44 is depressed until the upper surface 48 is lower than the nearest pair of lugs 22, 24. The cap 44 is then rotated so as to align the grooves 50 formed in the upper surface 48 with lugs 22, 24. The cap 44 is then allowed to rise due to the upward force created by the now compressed spring 34. Once the lugs 22, 24 are located in the grooves 50 this prevents the cap 44 from travelling further up or along the spine 12. The spring 34 remains semi-compressed when the cap 44 is locked in position and acts to retain the weights in position. In addition, depression of the weights causes the grooves formed in the base of the compression member 26 to receive the radially extending fins 20 located beneath the base plate. The location of the fins 20 in the corresponding grooves prevents rotation of the compression member when in position on the spine 12.

To release the weights, the reverse procedure is adopted.

Figure 16:
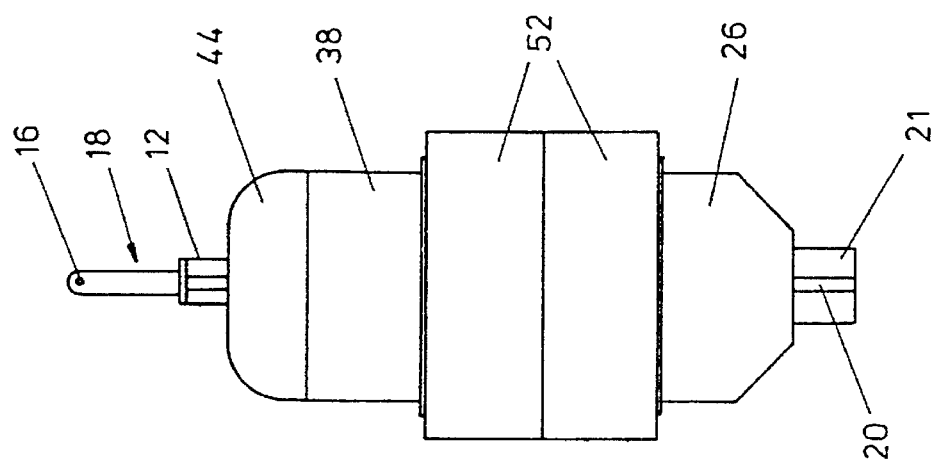
FIG. 16 shows a side view of the assembled weights and retaining washers of FIG. 15 with the addition of two secondary weight units.
Figure 15:
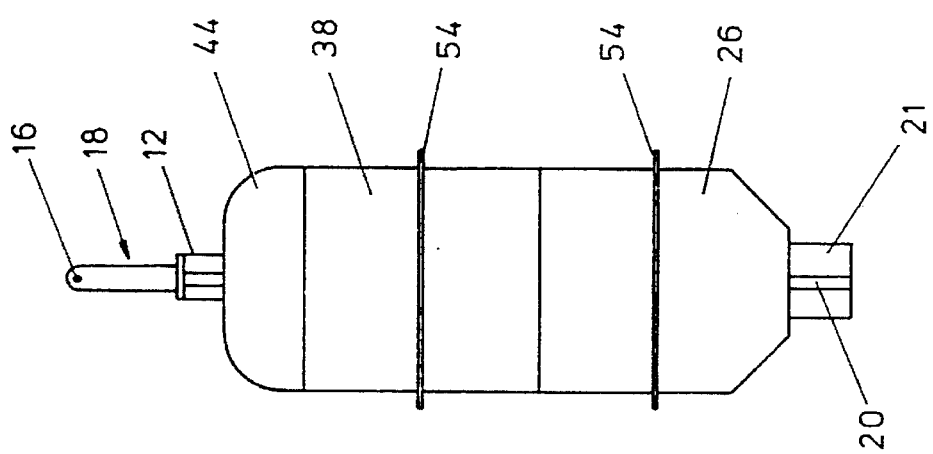
FIG. 15 shows side view of the assembled weights of FIG. 14 with restraining washers interspaced between the intermediate weight units.

If further weight is required, secondary weights 52 can be passed over the assembled intermediate weights 38 and retained in position by restraining washers 54. Such an arrangement is illustrated by FIG. 15 and 16.

Figure 17:
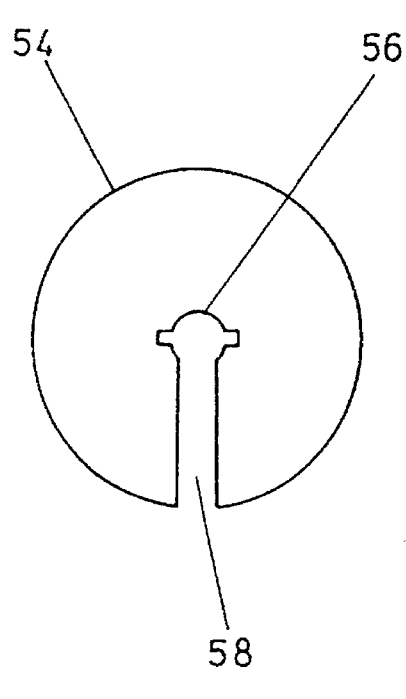
FIG. 17 is a plan view of a restraining washer and FIG. 18 is a side view of the same washer.
Figure 18:
Figure 19:
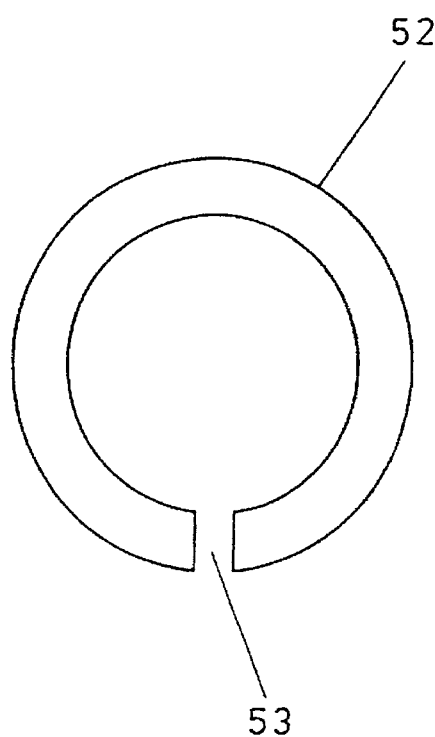
FIGS. 19 and 20 show, respectively, a plan and side view of the secondary weight unit.
Figure 20:
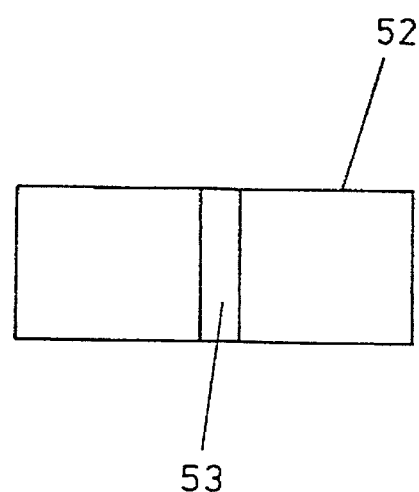

As shown in FIG. 17 and 18, the restraining washer 54 is formed with suitable shaped central aperture 56 and a radially extending slot 58 in the same way as the intermediate weights 38. If required, the restraining washers 54 are threaded onto the spine 12 in between the intermediate weights 38. A result of having a diameter larger than that of the intermediate weights, once in position the circumferential edge of the restraining washer 54 extends beyond the outer edge of the assembled intermediate weights 38. The secondary weights 52 are threaded on to the spine 12 in the way previously described for the intermediate weight, having a slot 53 to enable the weights to pass the fishing line when the spine 12 is attached to the line, and to pass over the assembled intermediate weights 38 and to be retained in position by the extending edge of the restraining washer 54. The remaining required intermediate weights 38 are built up and a second restraining washer 54 positioned in the same manner to prevent upward movement of the secondary weights.

Figure 23:
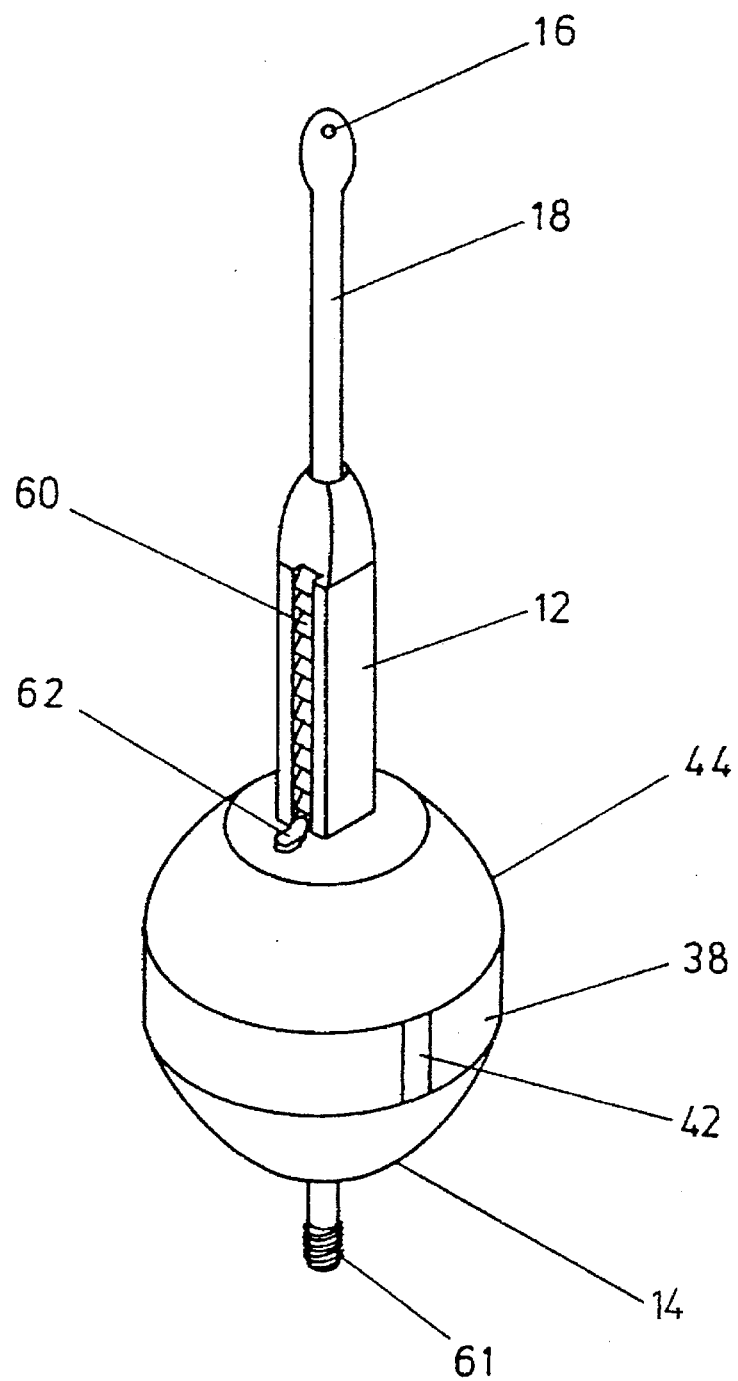

An alternative way of retaining the intermediate weights in position is shown by FIGS. 21, 22 and 23. In this embodiment, the spine 12 is formed with a ratchet 60 and the restraining cap 44 is formed with the corresponding ratchet tongue 62 which cooperates with the ratchet when the cap has been located in the required position. In this embodiment, the spine 12 extends beyond the base 14 and is formed with a screw threaded portion 61 to permit attachment to other tackle if required.

To add an additional weight 38 on to the spine 12 the locking cap 44 is displaced longitudinally along the spine 12, away from the base plate 14, beyond the extent of the neck or narrow region 18. The weight 38 is then moved transversely into engagement with the narrow portion 18 so that this narrow portion 18 passes through the slot 42 of the weight 38 into the bore 40. The weight 38 is then moved longitudinally along the spine 12 to engage the base plate 14. It can be seen here that the spine 12 is of a rectangular cross section with the corresponding aperture of the weight 38 also rectangular. This prevents relative rotational displacement between the weight 38 and the spine 12. Additional weight units may be added in this manner. Once the desired weight is obtained (it is envisaged in the preferred embodiment that up to twenty weight units may be added to the spine 12) the restraining cap is then slid along (or down) the spine 12 for the ratchet tongue to engage (under a spring biasing not shown) teeth of the ratchet 60 the cap is thus restrained relative to the spine 12 and restricts any longitudinal displacement of the weight units 38 relative to the spine 12. To remove the weights 38 from the spine the ratchet tongue 62 is displaced against its biasing to move out of engagement with the teeth of the ratchet 60 and then it is slid along the spine 12 to expose the narrow neck portion 18 and the weights then removed by adopting the reverse procedure to that described above.

A further embodiment of the invention is illustrated by FIGS. 24–29. An intermediate weight 38 is formed with additional apertures 64 in the upper surface of the weight and close to the outer edge. A slot 66 is formed in the weight 38 at the point when the aperture 64 is at its closest point to the edge of the weight. Located within the aperture 64 is a bead 68 secured to which is a wire 70. Wire 70 extends from the bead 68 and passes through the slot 66. A proportion 72 of the wire 70 lies parallel to the weight 38 and is located in a shallow groove (not shown) formed in the side of the weight. The remainder of the wire 74 is bent at an angle as shown in FIGS. 26 and 28.

Figure 30:
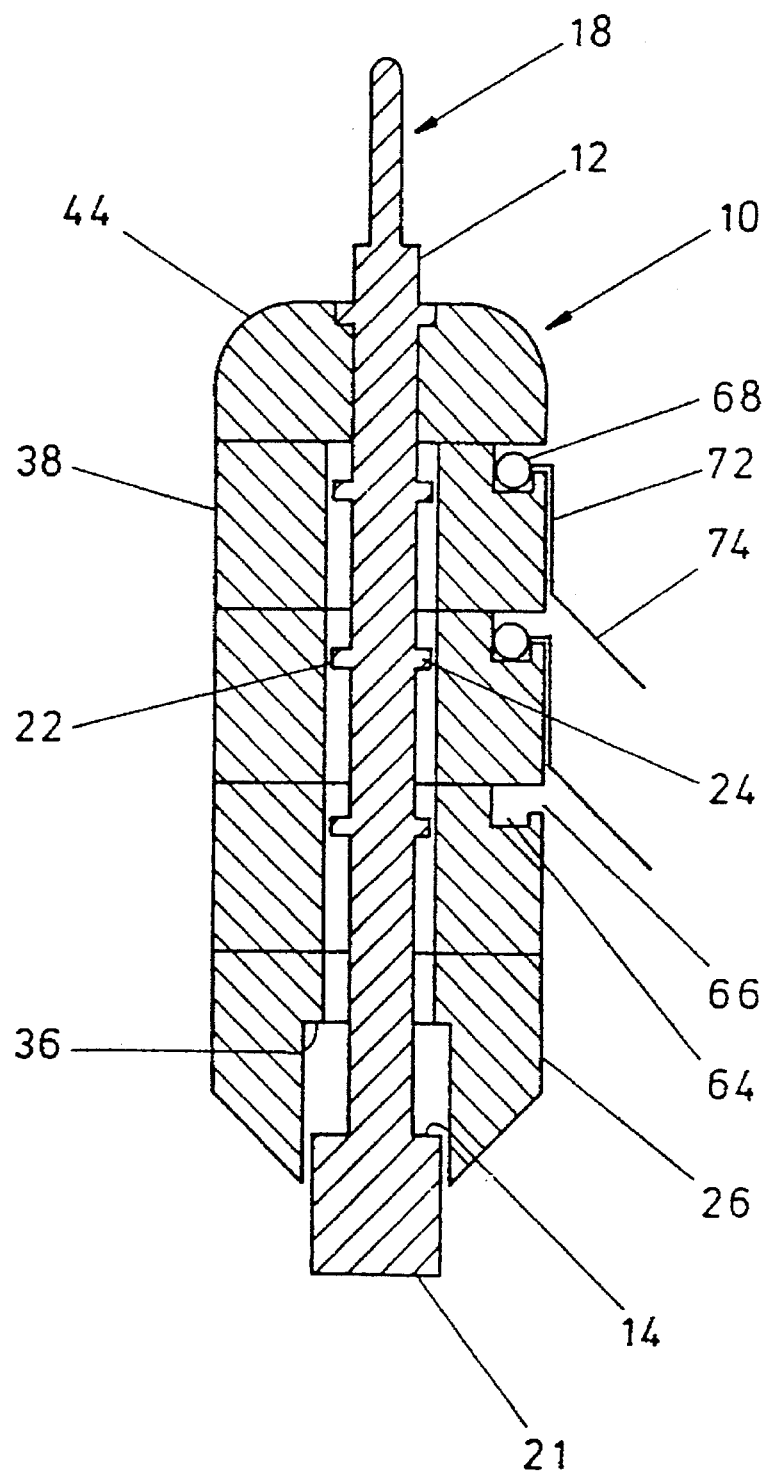
FIG. 30 is a diagrammatic section of the view of an assembled weight apparatus showing the location of the bead and wires secured thereto.

In use, the wire 70 extends from the surface of the weight 38 and acts to anchor the weight 38 on the sea bed. When the weight 38 is to be retrieved, such as when a fish has taken the bait, the force applied to the wires 70 lodged in the sea bed by the angler reeling in the line is sufficient to dislodge the wire 70 from the groove and the bead 68, being free to rotate within the aperture 64, causes the wire 70 to move and hang loosely permitting the weight 38 to be withdrawn. The bead 68 and the wire 70 are retained in the aperture 64 by virtue of placing the next weight 38 in position above the aperture 64 which prevents the bead 68 from becoming dislodged as shown in FIG. 30 whilst allowing the bead 68 sufficient room so as to rotate when required.

FIGS. 31 and 32 illustrate a further embodiment of the invention whereby the means for attachment 16 may be at the base of the spine and a screw threaded portion 76 provided so as to permit attachment of other tackle.

Figure 34:
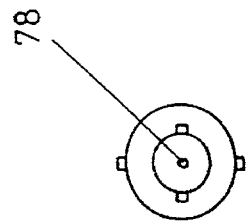
FIGS. 33 and 34 show a sectional and plan view respectively of a spine formed with a central aperture.
Figure 33:
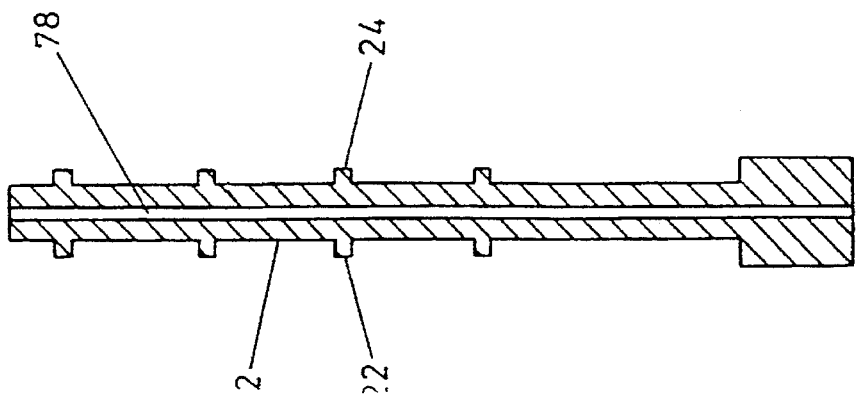

FIGS. 33 and 34 illustrate a spine 12 formed with a central aperture 78 to receive a fishing line to enable the weight carrying spine 12 to be threaded on to fishing line as opposed to attached to it.

Figure 35:
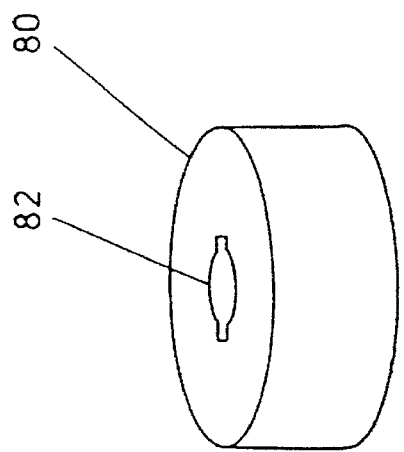
FIGS. 35 and 36 show diagrammatically a perspective and plan view respectively of intermediate weights which can be threaded on to the spine from the base and do not need to pass over the line.
Figure 36:
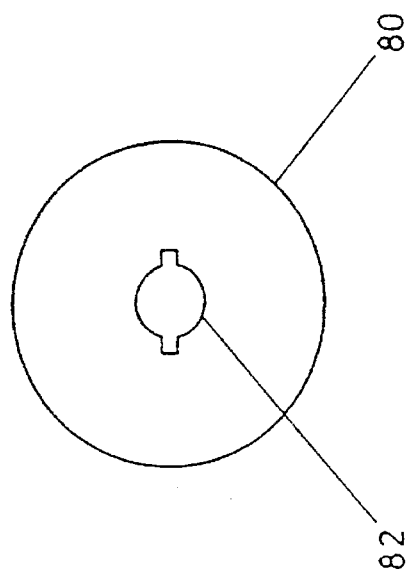

FIGS. 35 and 36 show diagrammatically a perspective and plan view respectively of an alternative form of intermediate weight 80 having a suitably shaped bore 82 which can be threaded on to the spine 12 and removed therefrom when the spine 12 is used in the alternative orientation as previously described so as to avoid the need for weight 80 to pass the fishing line.

As shown in FIG. 31 the line attachment means 16 is adjacent to the base plate 14 (not shown in FIG. 31). In this situation, the weights 80 do not require a slot to their outer periphery since when they are being added to the spine they are simply slotted over the end of the screw threaded portion 76 along the length of the spine. The cap member 44 is similarly slotted over the portion 76 to engage with the lugs in a manner previously described to lock and retain the weights upon the spine. In this embodiment, a neck or narrow portion of the spine is not required since the weights may be simply added to the apparatus at an end remote from the line connection means 16.

Figures 37, 38:
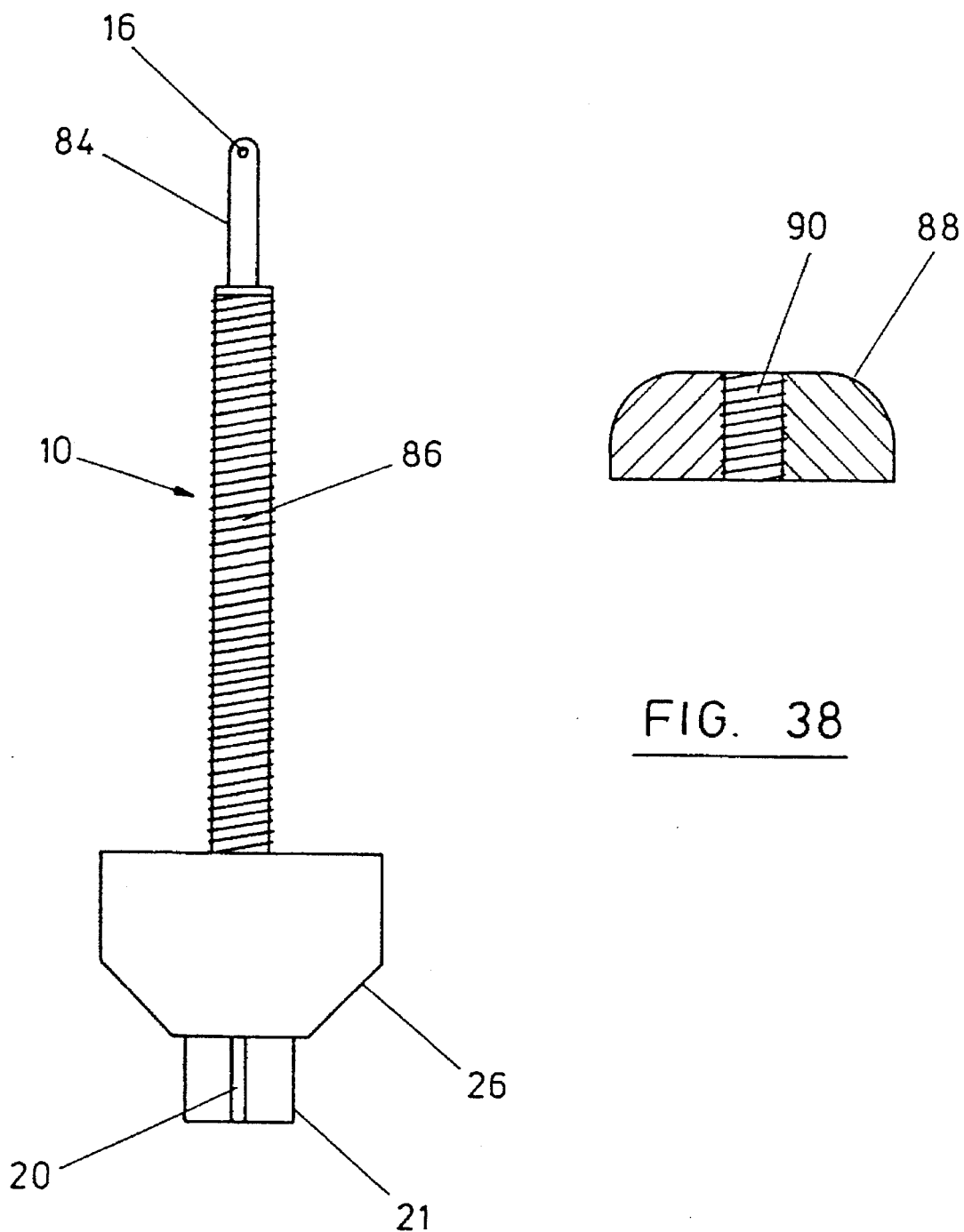
FIG. 37 shows a side view of the spine and compression member, said spine formed with a screw threaded portion.
FIG. 38 shows a sectional view of a locking cap formed with a screw threaded central bore.

FIGS. 37 and 38 illustrate a still further embodiment of the invention in which the spine 84 is formed with a screw or helical thread 86 so as to receive a locking cap 88 formed with a screw threaded central bore 90. In use, the locking cap 88 is screwed onto the spine 84 until it has reached the desired position when it is tightened against the pressure of the spring under the compression member 26 thus securing the weights 38 (not shown) in place on the spine 84.

It will be appreciated that the compression member 26 is not required in such an embodiment as shown in FIGS. 37 and 38 but may be considered as an optional feature. In addition the weight units for use with this embodiment do not require longitudinal extending grooves since there are no lugs on the spine 12. Also, in this particular embodiment the cap member may be considered as an optional feature since the weight units themselves may have screw threaded central bores for engagement with the thread 86 of the spine 84. In such a case each weight unit may also be considered to act as a cap member.

It will be appreciated that there are numerous other possible embodiments of the present invention. The size and shape of the spine and the weights may vary considerably depending on certain situations. In particular, in the preferred forms of the present invention the spines are intended to be able to receive up to twenty units. However, the spine size may be adjusted as required so that the maximum number of weight units capable of being supported thereon can range from two to twenty (or more). One such embodiment could involve the cap member and weight units having star shaped cross section whereby the points of such stars would help grip the seabed. In addition, where grip wires are employed these may be mounted on both of the opposite faces of the weight units. In addition, the secondary weights may also be provided with removable grip wires.

Furthermore, there are various types of retaining means which could be employed in the present invention to retain the cap member on the spine. One such retaining means could involve the spine having a longitudinally extending groove with the aperture of the cap member having a projection for complementary engagement with this groove to allow longitudinal movement along the spine. At predetermined positions along the spine there may further radially extending grooves so that when the cap member engages such radially extending grooves it may be rotated about the spine to prevent it from further longitudinal movement.

It will further be appreciated that several adjustable weight apparatus in accordance with the present invention may be interconnected if so required. It will also be appreciated the weight units themselves may be of varying standards. For example different materials may provide weight units of varying weights or alternatively, weight units having greater cross sectional areas may be used if a larger weight is required. In this manner, a simple spine member may be utilized for which many different weights may be obtained.

I claim:

1. An adjustable fishing weight apparatus comprising an elongate support means having longitudinally opposed ends, a plurality of discrete weight units longitudinally slidably supported on said support means, means for releasably retaining said weight units on said support means, line attachment means for attaching said apparatus to a fishing line, said support means having a fixed base adjacent one said end thereof, said retaining means comprising a locking cap member adjacent the longitudinally opposed said end of said support means, wherein said cap member is longitudinally adjustable along and engagable with said support means for said weight units to be disposed between said base and said cap member whereby engagement of said cap member with said support means restricts longitudinal movement of said weight units relative to said support means, said support means comprising an elongate spine having a cross sectional area and said weight units each comprising a longitudinally extending aperture having a width through which said spine is received in a complimentary fit, said spine having a neck portion toward said opposed end remote from said base and having a width and a cross sectional area substantially less than the cross sectional area of said spine, and wherein each said weight unit comprises a slot extending radially outwardly from said aperture to an edge of said weight unit forming a break in said edge, said slot having a width substantially less than said width of said aperture but greater than said width of said neck portion to allow said neck portion to pass through said slot.

2. An apparatus as claimed in claim 1 in which said base has a transversely extending surface area greater than the weight unit apertures.

3. An apparatus as claimed in claim 2 in which said weight units comprise engagement means for engagement with the spine to restrain longitudinal displacement of the weight means relative to the weight support means.

4. An apparatus as claimed in claim 3 in which the weight units have a uniform circular cross section and said cap member and said base plate both have circular cross sectional areas and which taper longitudinally outwardly of said weight support means.

5. An apparatus as claimed in claim 1 in which the cap member has a longitudinaly extending aperture through which the spine is received in a complimentary fit.

6. An apparatus as claimed in claim 5 in which said cap is engagable with said spine between said neck portion and said base.

7. An apparatus as claimed in claim 6 in which said spine has a circular cross section with a longitudinally extending axis and said locking cap member has a longitudinally extending circular aperture.

8. An apparatus as claimed in claim 7 in which said spine has a screw or helical thread on its outer surface and said cap has a similar thread formed on the inner surface of said aperture for screw threaded engagement with the spine.

9. An apparatus as claimed in claim 7 in which said retaining means comprises:

a compression member mounted coaxially on said spine inwardly and adjacent to said base with spring means disposed between said compression member and said base biassing said compression member away from said base;

said spine having an aligned array of lugs disposed longitudinally and equidistant along its length;

the apertures of said weight units having a longitudinally extending groove for cooperation with said lugs when mounted on said spine to allow the weight units to move longitudinally over said lugs; and said cap member having a longitudinally extending groove radiating outwardly from said aperture for cooperation with said lugs and a surface disposed away from said base with a recess in said surface radiating outwardly from said aperture and disposed offset from said groove;

said cap member being displaceable along said spine towards said base, compressing any weight units disposed therebetween and forcing said compression member against the biassing of said spring means towards the base so that the groove of the cap member passes over at least one of said lugs and where rotational displacement of said cap member about the spine brings said cap member recess into alignment with said lug so that when the force applied to said compression member is released the biassing of the spring means exerts a bias force away from the base through the compression member and adjacent weight units to the cap member to bias the cap member away from said base so that said recess engages said lug which restrains relative rotational and longitudinal displacement between said cap member and said spine.

10. An apparatus as claimed in claim 7 in which said weight units have a uniform length greater than the distance between adjacent lugs on said spine, so that said lugs engage with said weight unit grooves to restrict relative rotational movement between said weight units and said spine.

11. An apparatus as claimed in claim 10 in which the compression member comprises a longitudinally extending skirt which extends longitudinally outwardly beyond the base and which skirt engages with spine projections radiating outwardly from said spine beyond the extent of said base to restrict relative rotational displacement between said spine and said compression means.

12. An apparatus as claimed in claim 9 comprising secondary weight units having longitudinally extending central apertures corresponding in shape and size to the maximum cross section of the weight units so that said spine and weight units are received through the apertures of the secondary weight units in a complimentary fit and secondary retaining means are provided to restrain said secondary weight units from longitudinal displacement relative to said spine.

13. An apparatus as claimed in claim 12 in which said secondary retaining means comprise at least two restraining washers, each having a central aperture through which the spine may be received in a complimentary fit and a cross section greater than the cross section of the apertures of the secondary weight units, whereby said restraining washers are longitudinally disposed remote from each other on the spine at longitudinally opposed ends of at least one weight unit and restrained from longitudinal displacement relative to said spine by said retaining means and said secondary weight units are disposed between adjacent restraining washers to restrain said secondary weight units from longitudinal displacement relative to said spine.

14. An apparatus as claimed in claim 13 in which said restraining washers are disposed between two weight units, or a weight unit and the cap member or a weight unit and the base to restrain said washers from longitudinal displacement relative to said spine.

15. An apparatus as claimed in claim 14 in which said restraining washers comprise a slot extending radially outwardly from the central aperture to an edge of the restraining washer forming a break in the edge, which slot having a width substantially less than that of the aperture but sufficiently wide enough to allow the neck portion of the spine to pass through the slot.

16. An apparatus as claimed in claim 15 in which said restraining washers comprise notches extending radially outwards from said apertures for cooperation with said lugs when mounted on said spine to allow the restraining washers to move longitudinally over said lugs.

17. An apparatus as claimed in claim 16 in which each secondary weight unit comprises a slot extending radially outwardly from the central aperture to an edge of the secondary weight forming a break in the edge, which slot having a width substantially less than that of the aperture but sufficiently wide enough to allow the neck portion of the spine to pass through the slot.

18. An apparatus as claimed in claim 7 in which said weight units comprise removable grip wires.

19. An apparatus as claimed in claim 18 in which each said grip wire has a bead secured at one end and said weight units comprise two longitudinally opposed faces in which one of said faces has a recess towards the periphery of the weight unit and a slot extending transversely from said recess to the peripheral edge of the weight unit, in which the bead of the grip wire is received in said recess and the grip wire extends through said slot outwardly of the periphery of the weight unit.

20. An apparatus as claimed in claim 19 in which said bead is restrained within said recess by an adjacent face of an adjacent weight unit whereby relative longitudinal displacement between adjacent weight units is restrained.

21. An apparatus as claimed in claim 20 in which the wire extending proud of the weight unit is bent so that part of the wire lies parallel to a longitudinal outer surface of the weight unit, with the free end of the wire bent to project proud of the outer surface of the weight unit.

22. An apparatus as claimed in claim 21 in which said line attachment means extends longitudinally away from an end of said spine and having an aperture extending transversely therethrough.

23. An apparatus as claimed in claim 21 comprising a joining means for attaching an opposite end of said spine to said line attachment means to facilitate attachment of additional fishing tackle to said weight apparatus.

24. An apparatus as claimed in claim 23 in which said joining means comprises a screw threaded rod for reciprocal screw threaded engagement with a screw threaded member of additional fishing tackle.

25. An apparatus as claimed in claim 24 in which said spine has an aperture extending longitudinally therethrough, through which a fishing line is receivable to facilitate adjustable connection of said spine to said fishing line.

26. An apparatus as claimed in claim 25 in which said weight support means is made of moulded plastics material.

27. An apparatus as claimed in claim 25 in which said weight units are made substantially of metal.

28. An apparatus as claimed in claim 20 in which said bead is rotatable within said recess.

29. An apparatus as claimed in claim 6 in which said retaining means comprises said spine having a ratchet extending between said necks portion and said fixed base and said cap member having a ratchet tongue for engagement with said ratchet to restrain the cap from displacement relative to said spine.

30. An apparatus as claimed in claim 29 in which said cap has displacement means for displacing said ratchet tongue out of engagement with said ratchet to allow the cap member to move longitudinally relative to the spine.

31. An apparatus as claimed in claim 30 in which said displacement means comprises a pivoted ratchet tongue with an engaging end biassed so that said engaging end engages said ratchet in an unactuated position and whereby depression of an opposed end of said ratchet tongue pivots said engaging end to an actuated position out of engagement with said ratchet.

32. An apparatus as claimed in claim 31 in which said spine has a rectangular cross section and said weight units and said cap member have longitudinally extending rectangular apertures forming a complimentary fit with said spine to restrict relative rotational movement between said spine and said cap member and said spine and said weight units.

* * * * *